US010636136B2

(12) United States Patent
Valley

(10) Patent No.: US 10,636,136 B2
(45) Date of Patent: *Apr. 28, 2020

(54) WAFER NANOTOPOGRAPHY METROLOGY FOR LITHOGRAPHY BASED ON THICKNESS MAPS

(71) Applicant: GLOBALWAFERS CO., LTD., Hsinchu, R.O.C. (TW)

(72) Inventor: John F. Valley, Lake Oswego, OR (US)

(73) Assignee: GlobalWafers Co., Ltd., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 16/115,278

(22) Filed: Aug. 28, 2018

(65) Prior Publication Data

US 2018/0374206 A1    Dec. 27, 2018

Related U.S. Application Data

(63) Continuation of application No. 15/205,187, filed on Jul. 8, 2016, now Pat. No. 10,062,158.

(Continued)

(51) Int. Cl.
*G06K 9/00* (2006.01)
*G06T 7/00* (2017.01)
(Continued)

(52) U.S. Cl.
CPC .............. *G06T 7/0006* (2013.01); *G06T 5/10* (2013.01); *G06T 5/20* (2013.01); *G06T 7/0004* (2013.01);
(Continued)

(58) Field of Classification Search
CPC .................................. G06T 7/0006; G06T 7/60; G06T 5/20; G06T 5/10; G06T 2207/30148
See application file for complete search history.

(56) References Cited

U.S. PATENT DOCUMENTS 5,376,790 A    12/1994 Linker et al.
7,019,815 B2    3/2006 Jasper et al.
(Continued)

FOREIGN PATENT DOCUMENTS

EP    1521122 A1    4/2015
WO    2010025334 A2    6/2010

OTHER PUBLICATIONS

Valley, John et al., "Approaching New Metrics for Wafer Flatness: An Investigation of the Lithographic Consequences of Wafer Non-Flatness", presentation from SEMICON West, 2003, 12 pgs.
(Continued)

*Primary Examiner* — Aaron W Carter
(74) *Attorney, Agent, or Firm* — Armstrong Teasdale LLP

(57) ABSTRACT

A method for lithography nanotopography metrology is provided. The method includes receiving wafer thickness data for a plurality of wafers and applying an elongated filter to the wafer thickness data to produce a filtered thickness map for each of the plurality of wafers. The filter has a first cutoff wavelength in the x-direction and a second cutoff wavelength in the y-direction. The method further includes generating a report including at least one wafer metric associated with the filtered thickness map.

29 Claims, 14 Drawing Sheets
(12 of 14 Drawing Sheet(s) Filed in Color)

Surface Data; NMDG Filter

Thickness Data; FFT-DG Filter

Related U.S. Application Data

(60) Provisional application No. 62/191,002, filed on Jul. 10, 2015.

(51) Int. Cl.
*G06T 7/60* (2017.01)
*G06T 5/10* (2006.01)
*G06T 5/20* (2006.01)
*G06T 7/62* (2017.01)

(52) U.S. Cl.
CPC ............... *G06T 7/60* (2013.01); *G06T 7/62* (2017.01); *G06T 2207/20056* (2013.01); *G06T 2207/30148* (2013.01)

(56) References Cited

U.S. PATENT DOCUMENTS

| | | |
|---|---|---|
| 7,324,917 B2 | 1/2008 | Koliopoulos et al. |
| 8,768,665 B2 | 7/2014 | Veeraraghavan et al. |
| 10,062,158 B2 * | 8/2018 | Valley .................. G06T 7/0006 |
| 2004/0213477 A1 | 10/2004 | Nakajima et al. |
| 2004/0234166 A1 | 11/2004 | Nakajima et al. |
| 2007/0081156 A1 | 4/2007 | Treado et al. |
| 2007/0216898 A1 | 9/2007 | Gardner et al. |
| 2011/0194753 A1 | 8/2011 | Kamiyama et al. |
| 2012/0177282 A1 | 7/2012 | Chen et al. |
| 2012/0179419 A1 | 7/2012 | Chen et al. |
| 2013/0188179 A1 | 7/2013 | Tang |
| 2013/0236085 A1 | 9/2013 | Chen et al. |
| 2013/0304399 A1 | 11/2013 | Chen et al. |
| 2014/0192255 A1 | 7/2014 | Shroff et al. |
| 2016/0321799 A1 | 11/2016 | Chen et al. |
| 2017/0011505 A1 | 1/2017 | Valley |

OTHER PUBLICATIONS

Riedel, F. et al., "Impact of filtering on nanotopography measurement of 300 mm silicon wafers", Science Direct, Materials Science in Semiconductor Processing 5, 2003, pp. 465-472.

* cited by examiner

WAFER NANOTOPOGRAPHY METROLOGY FOR LITHOGRAPHY BASED ON THICKNESS MAPS

CROSS-REFERENCE TO RELATED APPLICATIONS

This application is a continuation of U.S. application Ser. No. 15/205,187 filed on Jul. 8, 2016, which claims priority to U.S. Patent Application Ser. No. 62/191,002, filed Jul. 10, 2015, which is hereby incorporated by reference in its entirety.

FIELD

The field relates generally to high-volume manufacturing (HVM) wafer quality analysis and, more particularly, to nanotopography (NT) metrology and analysis of HVM wafers for lithography using thickness maps.

BACKGROUND

Nanotopography (NT) refers generally to features of a semiconductor wafers that exist on the nanoscopic scale, having a height of a few nanometers. NT includes topographic features attributable to the middle spatial-frequency components of wafer topography, and is defined as including spatial wavelengths of approximately 0.2-20 mm. Shorter wavelengths, higher spatial frequencies, are associated with micro-roughness, which is typically measured in a microscopic field-of-view. Longer wavelengths, lower spatial frequencies, are associated with wafer global topography such as global flatness (i.e., wafer thickness) and shape (i.e., free-form surface figure). Flatness, shape and NT are typically measured concurrently using a single data acquisition from a wafer.

NT metrology is often applied to the wafer front or back surface topographic data. This paradigm was established when wafer surface NT was an impediment to post-CMP film thickness uniformity during shallow trench isolation (STI) process integration. With the advent of 300 mm diameter wafers came double-side polished wafers where the NT was greatly reduced and no longer impacted STI process integration. NT metrology continued to be used as it appeared to scale with lithographic process needs. Recently, NT-to-lithography scaling appears to have stopped. Some wafer manufacturers believe that the wafer shape now dominates the NT signal using the surface topography paradigm. Existing wafer NT quality metrics may be improved by subtle improvements to the wafer shape. Yet the topography of interest in lithography is not shape, it is thickness.

Changes to the NT metrology and analysis paradigm may be desirable to achieve NT quality metrics that track with lithography. In particular, there is a desire to use NT metrology (NTM) for identification of wafer features impacting lithography (litho-NTM), for example, in manufacturing integrated circuits, especially during the era of multi-patterning. Wafer end users (e.g., lithographers, IC manufacturers) are seeking litho-NTM that better enables leading edge lithography, therefore high-volume wafer manufacturers are seeking litho-NTM to perform quality control that ensures wafers being used for lithography are of suitably high quality. Of particular interest are NT features on the high-volume manufacturing (HVM) wafers that impact lithography, because they are not possible to be adequately leveled. These features may be located on the front, back, or both surfaces of the wafer.

Modern step-and-scan lithography is designed to image very small-scale patterns on a wafer to produce an IC. The smaller scale can reduce the cost of circuits while making them faster and/or reducing their power consumption. Current advanced lithography systems, accordingly, require incredibly high precision and accuracy to achieve proper focus of the critical dimensions and enable overlay of the sequential lithography steps that make up the IC (transistors and interconnect). The wavelength of the light and the optical properties of the lithography lens have a great impact on the accuracy and precision at such small scales. Most current lithography systems utilize ultraviolet light with a wavelength of about 193 nm (0.2 µm). Extreme ultraviolet (EUV) lithography may be used for some lithographic exposure steps in HVM IC production using a wavelength of about 13.5 nm. "Step-and-scan" lithography refers to the pattern exposure path the lithography system takes across the wafer. The pattern on the reticle is printed at each site on the wafer by the lithography tool stepping to each site in sequence. At each site the reticle is scanned using an exposure slit while the lithography tool simultaneously translates and levels the wafer to pattern the photoresist (PR) deposited on the wafer.

After the wafer with deposited PR enters the lithography section of the exposure tool, it is chucked to an extremely flat surface known as a "litho chuck." Wafer leveling to the projected image is based on chucked-wafer topography data. Each wafer is fixed to a chuck, typically using a back-side vacuum with a sealing ring around the back wafer perimeter (e.g., 0 atm at the back surface of a wafer and 1 atm at the front surface of a wafer), which eliminates or reduces many high-order (e.g., mm-level and cm-level) surface irregularities and variations in the wafer (commonly known as wafer shape). Electro-static chucking is required for EUV lithography where the ambient environment during exposure is already vacuum. The chucked-wafer front surface topography is therefore given by the sum of the three terms: the chuck topography, the wafer thickness, and the chuck-to-wafer gap. As an equation: $Z(x,y)=Z_{chuck}(x,y)+t_{wafer}(x,y)+gap(x,y)$; where the gap term is typically assumed to be approximately zero and may be negative when the wafer back surface comes below the ideal continuous surface of the chuck.

Modern lithography tools have more than one chuck so that the chucked-wafer topography can be measured at a metrology station within the exposure tool then translated over to an exposure station within the same tool while never being de-chucked between measurement and exposure. This approach permits improved designs for the metrology station than were not possible when using the exposure station, as in previous generation lithography tools when the chucked-wafer topography was measured during the exposure step. Having more than one chuck to transfer between stations enables the improved metrology to occur without reduction of the overall throughput. While the previously measured wafer is being exposed on its chuck, a new wafer is being measured on its chuck so the throughput remains exposure-time limited.

Existing NTM as it relates to wafer HVM was designed for quality control of wafer front-surface topography that might lead to film thickness variation after chemical mechanical polishing (CMP), particularly for shallow trench isolation (STI). This NTM development was largely driven by STI process difficulties with 200 mm wafers that were single-side polished (SSP). The CMP process tool applied pressure during front surface polishing that was largely independent of back surface topography (nano-scale or otherwise). For IC HVM, the use of stiff-pad polishing was preferred. However, front-surface NT then impacted post-CMP film thickness variation, mostly due to the SSP wafering process.

Currently, a double-side polished (DSP) wafer is typically used during leading edge IC HVM, and the issue of post-STI CMP film thickness variation is largely resolved by using the DSP wafer. However, the NTM developed for post-STI CMP analysis remained useful for the purpose of quality control for lithography. Over many years, the IC device design rules have continued to shrink while the existing NT metrics have proven difficult to scale accordingly.

At least some known litho-NTM processes are extensions of existing NTM philosophies, as previously applied to post-STI CMP analysis. In at least some cases, wafer surface data is filtered using convolution-based Gaussian, double-Gaussian, or other filters with small area convolution kernel functions made possible by using small spatial cut-off wavelengths (such as 5 mm rather than 20 mm or longer). Such filtering is not appropriate in the context of modern lithography for two primary reasons. First, the surface height data used includes the wafer surface figure or shape, which is almost entirely removed by chucking the wafer to one of the lithography tool's chucks. Second, the short cut-off wavelength of the circularly symmetric filter is not appropriate for the leveling under the slit exposure imaging area of the lithography tool. The resulting surface maps have little relevance to lithography.

Using surface data necessarily requires accounting for free-form wafer shape. When surface data is filtered (to remove higher-order topography, such as on the micrometer scale), a filter cutoff wavelength of 5 mm may be used to filter out the wafer shape data, which can introduce large artifacts around the fixed quality area (FQA; the area to receive the lithography where the wafer's specifications apply). Moreover, there is little value in filtering front and back surface data individually. In particular, analyzing the back surface alone ignores back surface interaction with the lithography chuck. The wafer front surface height during exposure is directly related to wafer thickness and not to the wafer's front and back surface topography.

In at least some known NTM processes, surface data analysis and reporting is performed using arbitrary "sites" or physical areas of a wafer surface. However, the reporting of NTM site metrics causes too much data to be reported with little benefit, and as such is not very useful for HVM wafer analysis. NTM site metrics, especially those reported for both front and back surfaces independently, will rarely contain data points of interest, and due to the volume of data reported, makes the resulting wafer HVM data difficult to mine for process signatures or quality decay.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

In one aspect, a method for lithography nanotopography metrology is provided. The method includes receiving wafer thickness data for a plurality of wafers and applying an elongated filter to the wafer thickness data to produce a filtered thickness map for each of the plurality of wafers. The filter has a first cutoff wavelength in the x-direction and a second cutoff wavelength in the y-direction. The method further includes generating a report including at least one wafer metric associated with the filtered thickness map.

In another aspect, a system for lithography nanotopography metrology includes a processor, a display device, and a memory device. The memory device stores instructions that, when executed by the processor, cause the system to: receive wafer thickness data for a plurality of wafers, apply an elongated filter with a first cutoff wavelength in the x-direction and a second cutoff wavelength in the y-direction to the wafer thickness data to produce a filtered thickness map for each of the plurality of wafers, generate a report including at least one wafer metric associated with the filtered thickness map, and display the report on the display device.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

The patent or application file contains at least one drawing executed in color. Copies of this patent or patent application publication with color drawings will be provided by the Office upon request and payment of the necessary fee. As the color drawings are being filed electronically via EFS-Web, only one set of the drawings is submitted.

DETAILED DESCRIPTION

Figure 1:
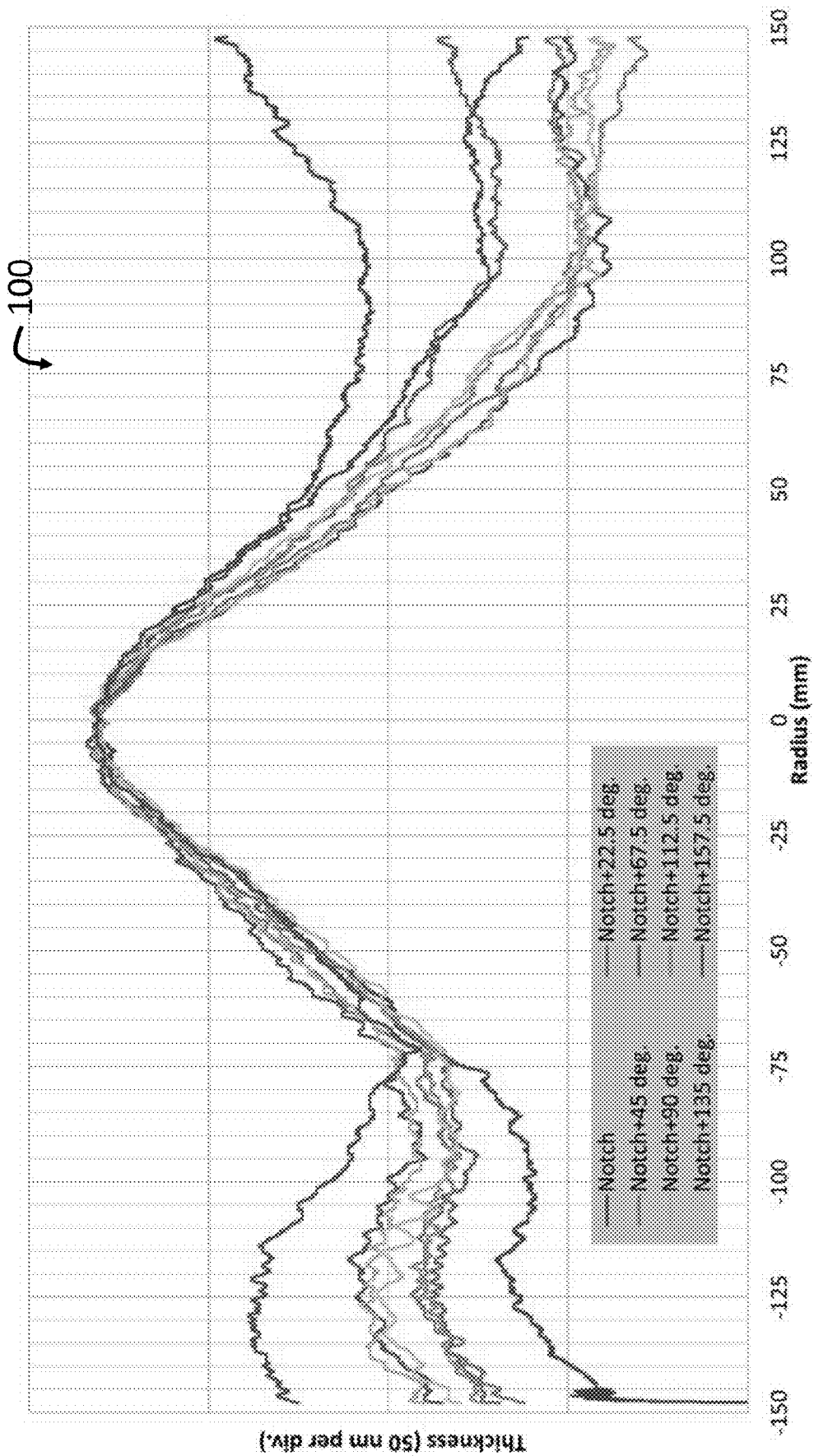
FIG. 1 is a graph of measured thickness profiles of a wafer at various angles relative to a fiducial notch.

The nanotopography metrology (NTM) methods described herein provide analysis of high-volume manufactured (HVM) wafers using thickness data and reporting of wafer nanotopography (NT) features. In particular, the NT metrics are reported in the context of a lithography system ("litho-NT"). In at least one embodiment, the NTM methods may be performed by a lithography NTM (litho-NTM) computing device.

When analyzing HVM wafers (e.g., performing quality control), a plurality of wafers may be analyzed and reported on as a group. Accordingly, thickness data for the wafers must be measured and received. A "thickness profile" of one or many wafers may be then generated, such that high-order wafer metrics may be determined and/or reported (e.g., wafer shape, flatness). HVM wafer quality control is performed to determine, in the example embodiment, whether the plurality of wafers are suited for lithography. Such a determination may center on whether the wafers are of suitably high quality or have sufficiently few manufacturing process defects. For example, having particularly extreme features at certain locations on a wafer, such as inside of a Fixed Quality Area (FQA) on which lithography is performed, may impose a lower grade on the plurality of wafers, such that they are unsuitable for lithography.

Wafer thickness analysis, as opposed to wafer surface analysis, is relevant to modern lithography processes. When a wafer is chucked, the back surface is taken to be a flat reference. Accordingly, in the limit of ideal chucking, where the chuck is perfectly flat and there is zero gap between the wafer and the chuck, any chucked wafer topography may be considered thickness variations from the flat, back surface. The chucking process also eliminates any wafer shape (i.e., warp and/or bow). Additionally, the lithography tool performs active levelling of the exposure area projected through the slit, which leaves focal-plane topography dominated by NT features. That is, the wavelengths of thickness variation longer than NT are largely removed by the lithographic leveling process.

One problem to be solved, then, is how to locate, characterize, and identify these features. Thickness variation corresponding to the longer wavelength wafer topography must be filtered out, leaving only NT only thickness maps of the wafer (or groups of HVM wafers). An appropriate filter should be selected that accurately maps the thickness data in a lithography context. In other words, a filter is applied (in one embodiment, using a Fast Fourier Transform) in a way that emulates how the wafer will be exposed during the lithography process. In particular, an elongated (e.g., rectangular, elliptical, etc.) filter with a long cutoff wavelength in the x-direction and a short cutoff wavelength in the y-direction is defined, such that the output thickness map includes all of the NT features as they would be encountered during the lithography step-and-scan exposure process.

Several thickness metrics (such as Site Frontside Referenced Least Squares Focal Plane Range (SFQR) and Edge SFQR (ESFQR), metrics of wafer flatness) are provided as litho-NT metrics, though these metrics are typically cited for sites or regions across the wafer, as described above. Site reporting may make it difficult to visualize how an HVM wafer feature impacts the lithography process, let alone to identify a precise location of the NT feature.

According to various embodiments described herein, using the filtered thickness maps, the most extreme or "worst" features are located and reported using various characterization metrics. In the example embodiment, the NT features are reported according to particular percentage of the wafer area including the worst NT features. Individual areas on the thickness map are "flagged," and the locations of these areas are reported as (x,y) coordinates. Such precise reporting enables the identification of NT features impacting the lithography tool, as well as stacked-map analysis of multiple wafers. Stacked maps, as the name suggests, "stack" reported features of HVM wafers, such that defects common to a batch of wafers may be identified.

FIG. 1 is a graph 100 of measured thickness profiles of a wafer at various angles relative to a fiducial notch. This raw wafer thickness data may be collected using conventional methods. For example, in at least some thickness measurement systems, a wafer is placed between two non-contact measurement probes. By monitoring changes in the distance from an upper probe to a front surface, and in the distance from a lower probe to a back surface, thickness of the wafer is calculated. In one embodiment, the thickness profile may be generated, provided, and/or received by the litho-NTM computing device. Additionally, raw thickness data and/or thickness profiles may be received, generated, and/or provided for a plurality of wafers.

Figure 2:
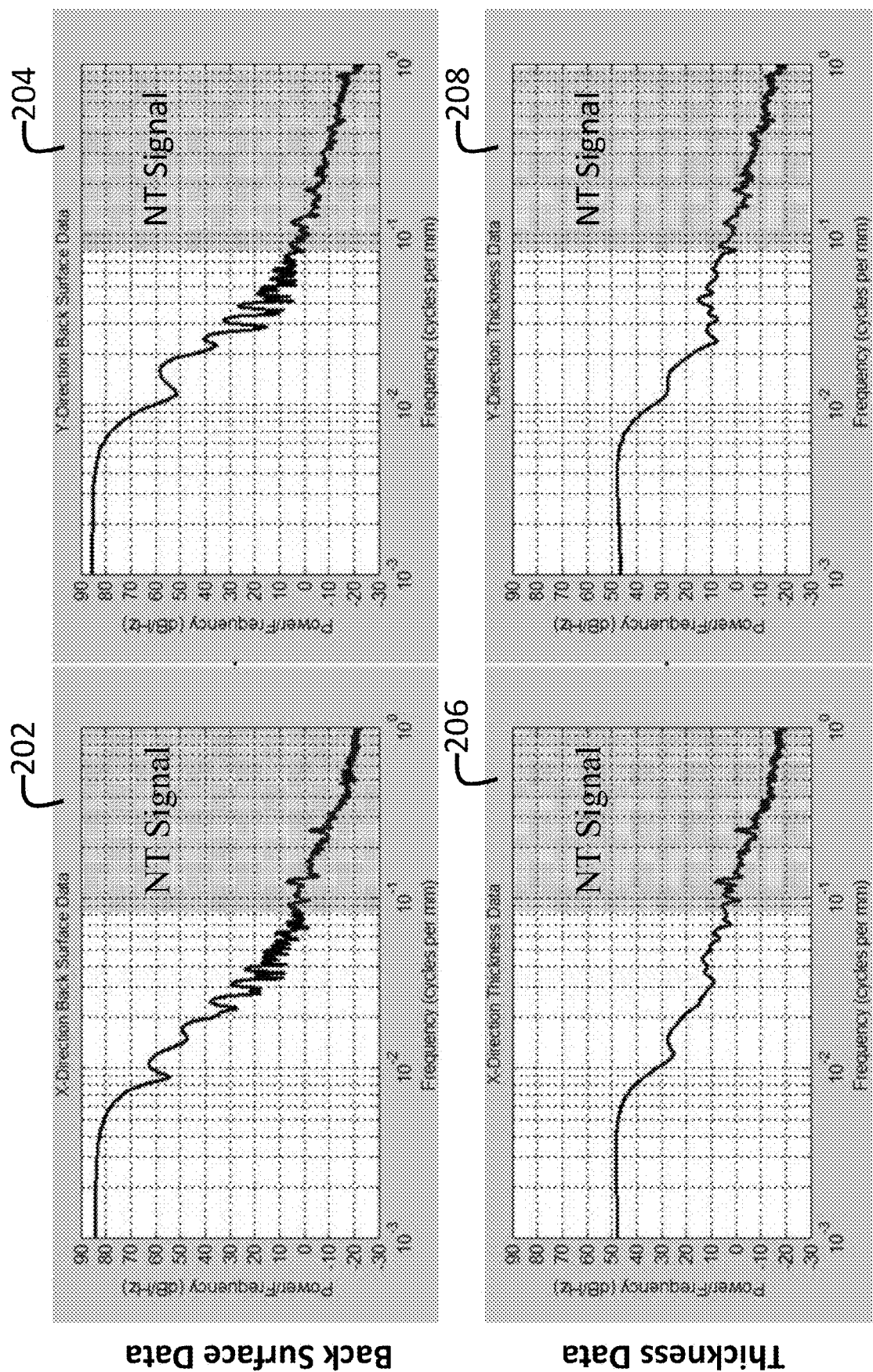
FIG. 2 includes thickness data and back surface data plots depicting the wafer surface and thickness data as power spectral density (PSD) in the frequency domain.

FIG. 2 includes thickness data and back surface data plots depicting the wafer surface and thickness data as power spectral density (PSD) in the frequency domain. In one embodiment, plots 202, 204, 206, and 208 are provided by a litho-NTM computing device. In each of plots 202, 204, 206, and 208, the shaded region represents the frequency range of interest for NTM (i.e., an "NT Signal"). The unshaded region represents the frequency signal corresponding to higher-order wafer variations, which is filtered out upon application of a high-pass filter, for example, by the litho-NTM computing device.

Plots 202 and 204 show back-surface data in the x- and y-directions, respectively. Surface data includes high-order wafer shape (i.e., bow and warp). Plots 202 and 204, accordingly, include higher-order data on the order of 80-90 dB/Hz. However, as described above, wafer shape is largely removed during the lithography process when the wafer is chucked. Applying a high-pass filter in the frequency domain to the surface data leads to a high-magnitude rejection of power (about a magnitude 8.5 power rejection), which creates strong reflection of power from edge discontinuities in the high-pass filtered surface data.

In contrast, thickness data, as shown in FIG. 1, does not include wafer shape. Plots 206 and 208 show thickness data in the x- and y-directions, respectively. Plots 206 and 208 include high-order data only up to the order of about 40-50 dB/Hz, or three to five orders of magnitude less than the surface data. Accordingly, applying a high-pass filter in the frequency domain to the thickness data creates a power rejection of a much lower magnitude than in the surface data (only about a magnitude 4.8 power rejection). This enables high-pass filtering without special edge treatment to reduce "ringing" around the wafer perimeter.

Figure 3:
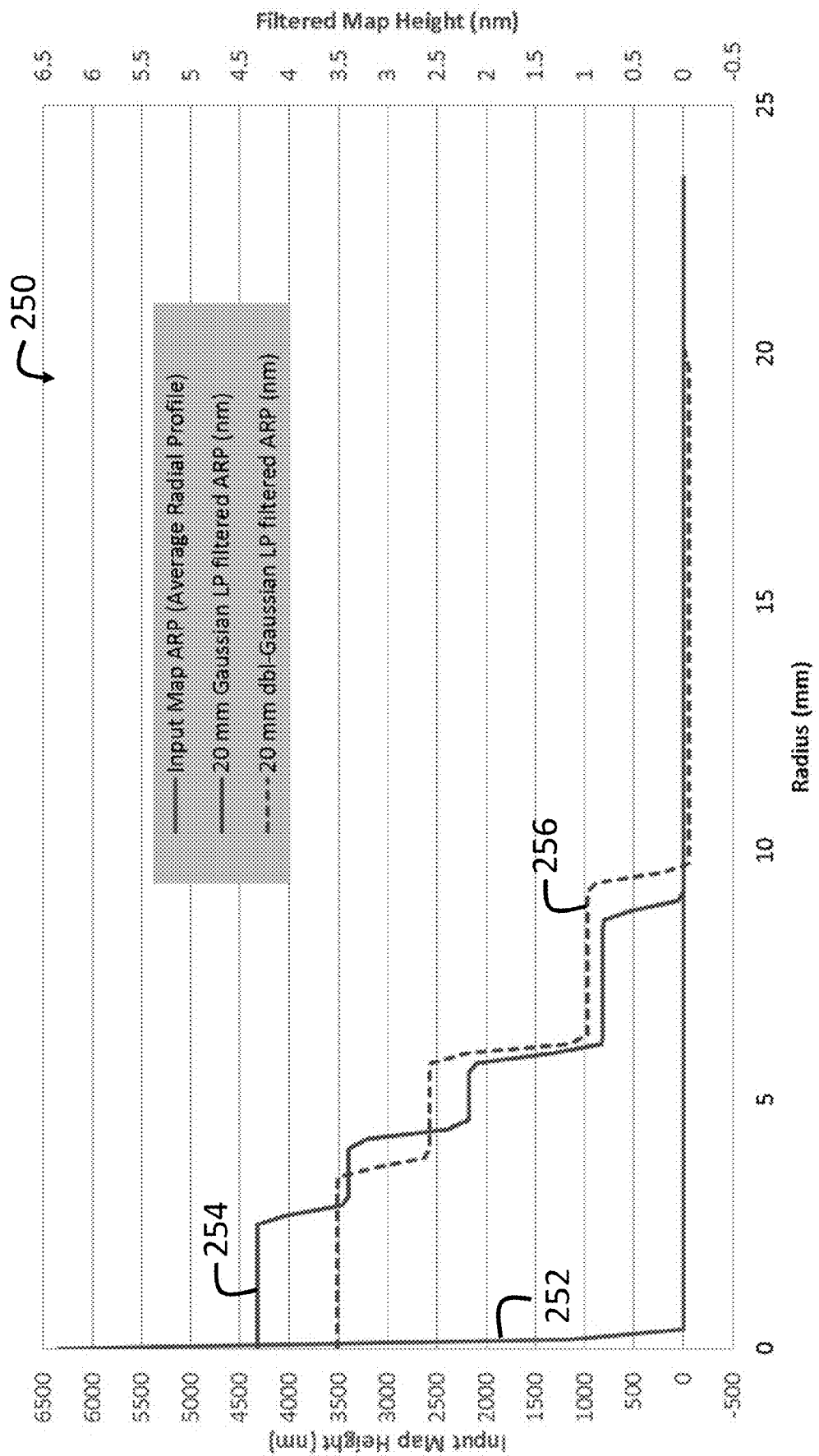
FIG. 3 is a graph of an average wafer radial profile before and after applying a NanoMapper® filter.

FIG. 3 is a graph 250 of an average wafer radial profile (ARP) before and after applying a NanoMapper® (NM; NanoMapper is a registered trademark of KLA-Tencor Corporation, Milpitas, Calif.) filter. More particularly, graph 250 includes an input map ARP 252 of wafer height data before a low-pass filter is applied. Graph 250 further includes a 20 mm Gaussian low-pass filtered ARP 254 and a 20 mm double-Gaussian (DG) low-pass filtered ARP 256. ARP 256 is the NanoMapper double-Gaussian (NMDG) impulse response to the rotationally symmetric input map ARP 252. The centered impulse input 252 reveals the spatial domain convolution filter kernels as the outputs 254 and 256.

Figure 4:
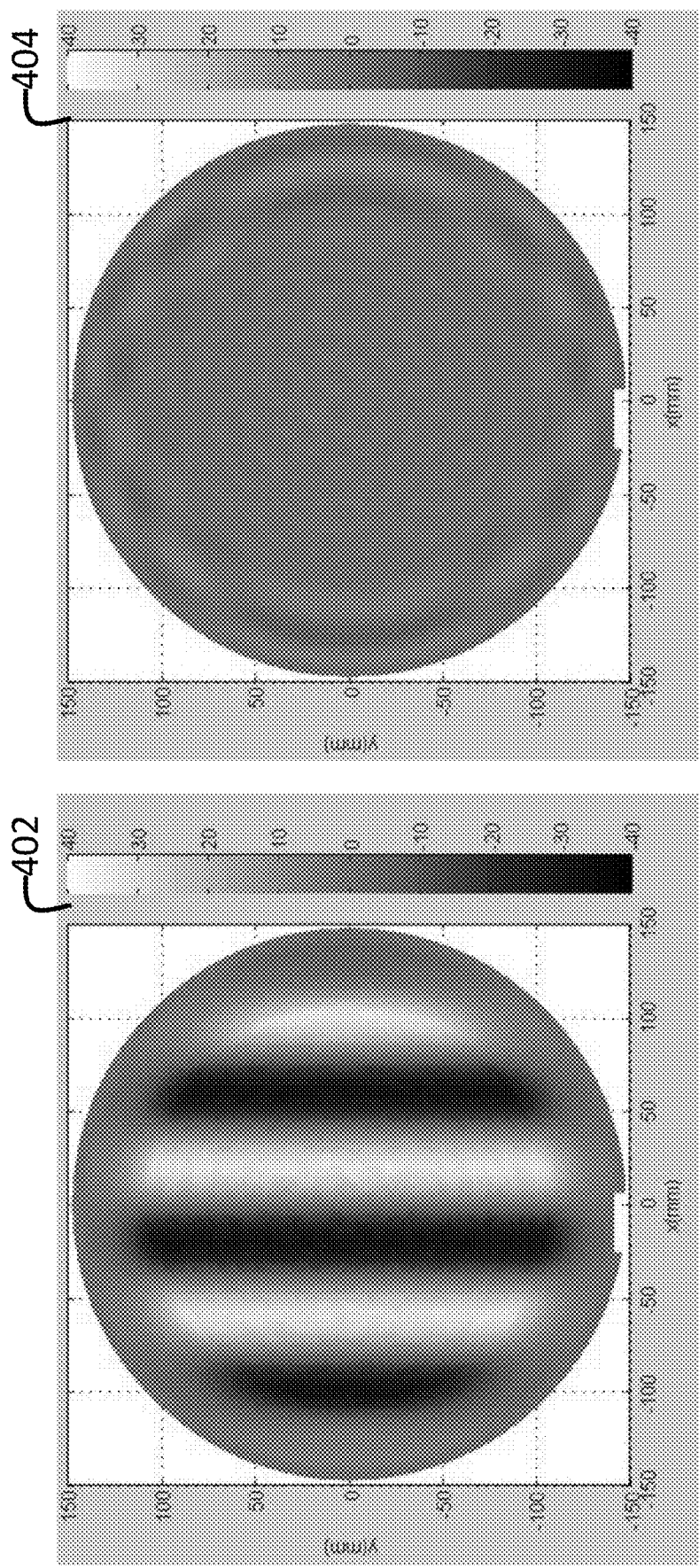
FIG. 4 includes maps of filtered wafer surface data after the filter described with respect to FIG. 3 is applied, compared to using a true double-Gaussian Fast Fourier Transform (FFT) (frequency domain) filter, such that surface NT data remains.

FIG. 4 includes maps of filtered wafer surface data after the filter described with respect to FIG. 3 is applied, compared to using a true double-Gaussian Fast Fourier Transform (FFT) (frequency domain) filter, such that surface NT data remains. In one embodiment, the filter is applied to the wafer surface data by the litho-NTM computing device. Accordingly, plots 402 and 404 may be provided by the litho-NTM computing device.

In the example embodiment, a 20 mm high-pass spatial wavelength filter is applied to surface data for a plurality of wafers. Using a high-pass frequency filter emphasizes fine details in an image; in the example embodiment, these fine details are the wafer NT. Plot 402 shows the surface data with an NMDG convolution filter applied thereto. The NMDG filter is rotationally symmetric but requires fairly large wafer edge attenuation, which can clearly be seen in plot 402. Plot 402 also depicts a strong long-wavelength bleed through due to the finite spatial domain size of the 20 mm cutoff-wavelength convolution kernel employed in the NMDG filter.

Plot 404 shows the surface data with a Fast Fourier Transform-double Gaussian (FFT-DG) filter applied thereto. The FFT transforms the spatial data to the frequency domain. The frequency data is multiplied by the chosen filter function (i.e., a functional curve). An inverse FFT is performed on the filtered frequency data, which transforms the frequency data back into (filtered) spatial data. In alternate embodiments, a polar Fourier Transform may be implemented. Edge attenuation was also applied in the FFT-DG filter. The FFT-DG filter achieves true double-Gaussian filtered surface data, and shows greatly reduced long-wavelength bleed-through. Plot 404, compared to plot 402, clearly illustrates that an FFT-DG filter is preferable to isolate the NT signal.

Figure 5:
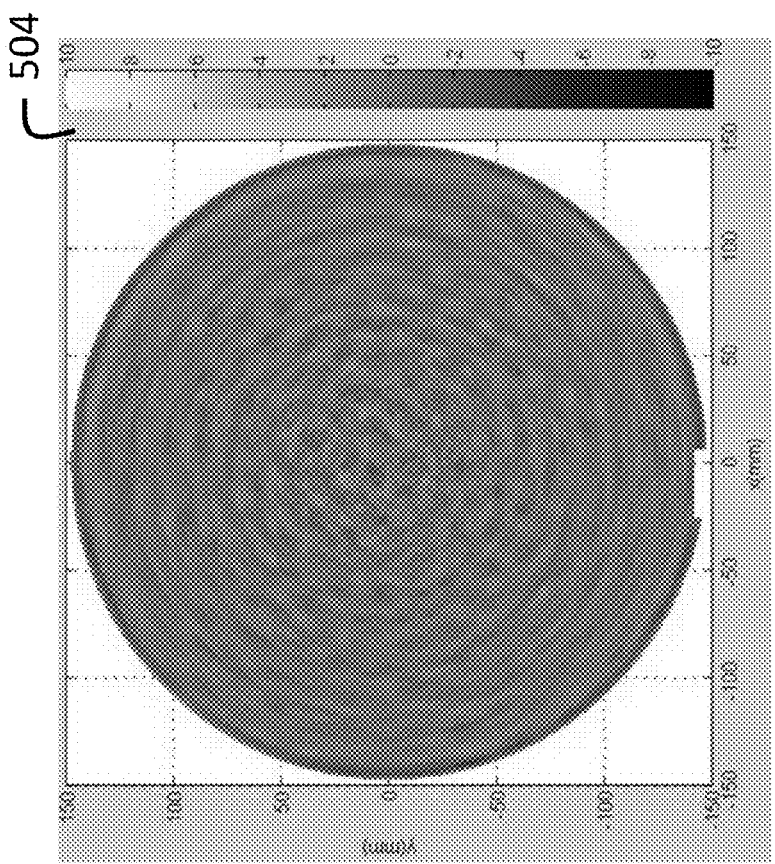
FIG. 5 includes maps of filtered wafer thickness data after the filter described with respect to FIG. 3 is applied, compared to using a true double-Gaussian Fast Fourier Transform (FFT) (frequency domain) filter, such that thickness NT data remains.
Figure 5:
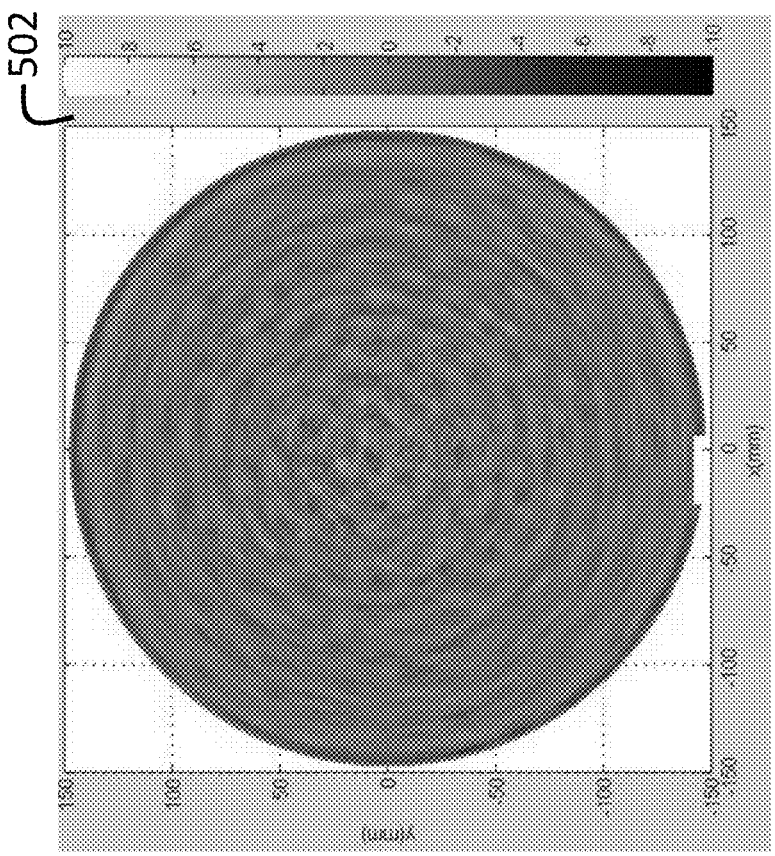

FIG. 5 includes maps of filtered wafer thickness data after the filter described with respect to FIG. 3 is applied, compared to using a true double-Gaussian FFT (frequency domain) filter, such that thickness NT data remains. In one embodiment, the filter is applied to the wafer surface data by the litho-NTM computing device. Accordingly, plots 502 and 504 may be provided by the litho-NTM computing device.

In the example embodiment, a 20 mm high-pass spatial wavelength filter is applied to thickness data for a plurality of wafers. Plot 502 shows the thickness data with an NMDG filter, as described above with respect to plot 402 (FIG. 4), applied thereto. Plot 504 shows the thickness data with an FFT-DG filter, as described above with respect to plot 404 (FIG. 4), applied thereto. In contrast to the filters applied with respect to plots 402 and 404, no edge attenuation is needed to filter the thickness data because the topographic power removed by the filter, as shown in FIG. 2 is nearly five orders of magnitude lower. Although both filters appear to perform well on the thickness data, the FFT-DG filter applied to produce plot 504 completed faster. Additionally, the true Double-Gaussian data may be preferred over the NMDG filtered data, as FFT-DG filtering produces an exact functional spectral response. The FFT-DG filter reveals features appropriately given the filter cutoff wavelength (e.g., 20 mm).

Plots 502 and 504 depict wafer thickness NT, with features measuring up to about 6-8 nm in height (in both the +z and the −z direction). However, it may be unclear where the most extreme features are, and how extreme those features are. It appears that the edge, as described above, includes particularly extreme features, evidenced by the dark ring around the edge of the wafer. The rest of the wafer area, however, appears mottled with NT fairly randomly. Although such random NT features may be realistic and/or common in HVM wafers, it may be useful to illustrate how thickness maps can be used to identify very extreme, localized features.

Figure 6:
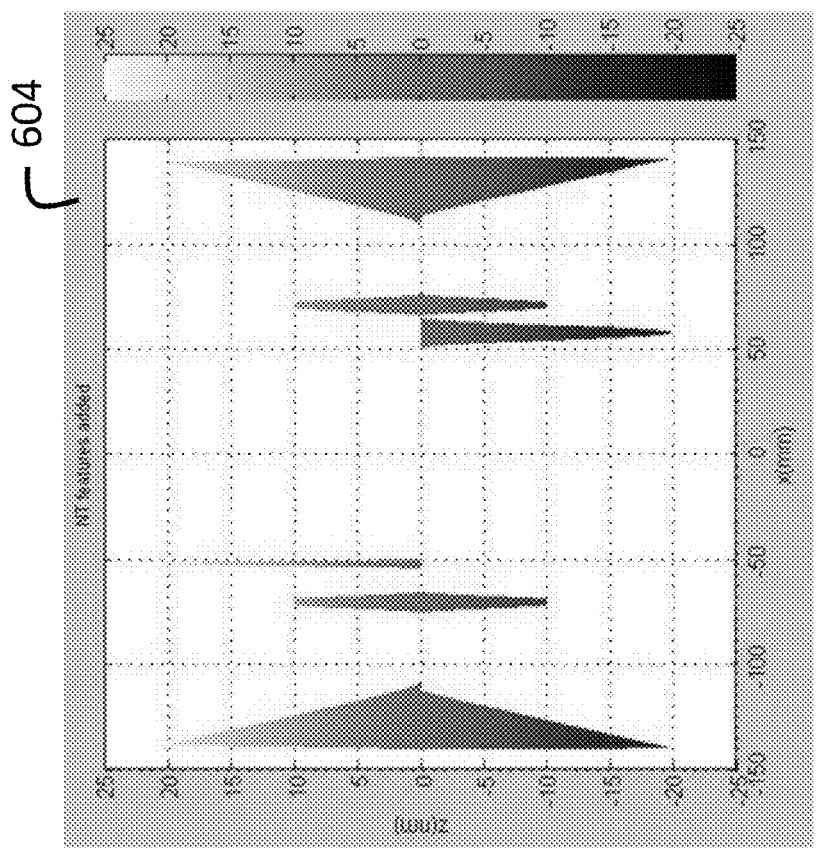
FIG. 6 is a thickness map of thickness data with only localized theoretical features.
Figure 6:
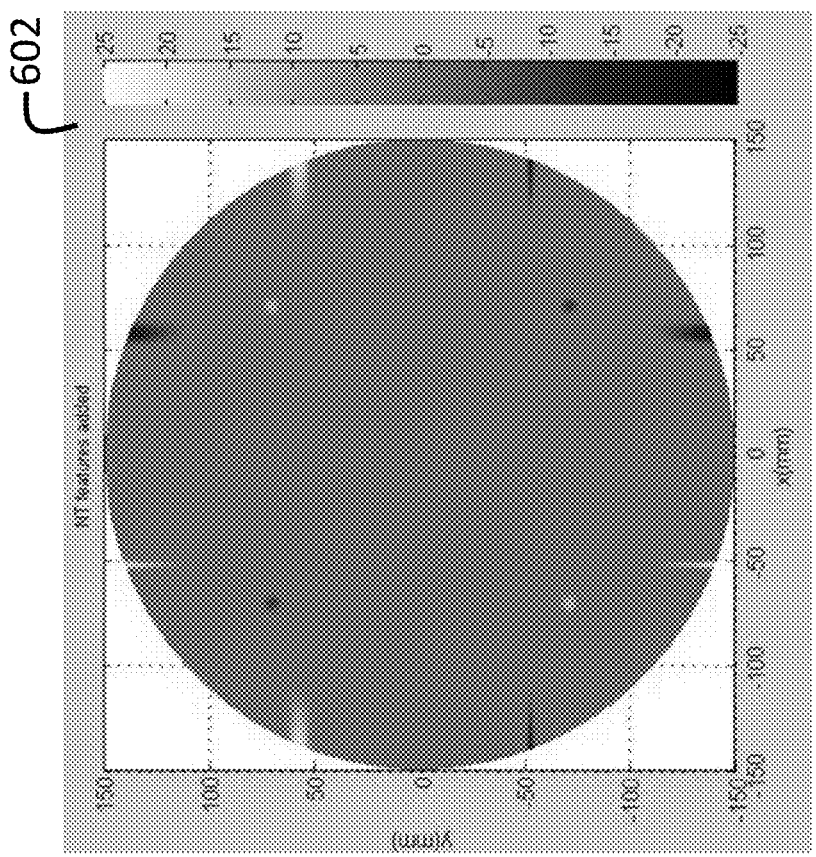

Accordingly, FIG. 6 is a thickness map of thickness data with only localized theoretical features. The features are only illustrative and should be taken as example only, and should not be taken to limit the disclosure herein to any particular features. Plot 602 shows a top view of the features, and plot 604 shows a side view of the features. Features shown in a lighter shade indicate raised features, with respect to the wafer's front surface ("front features"). Features shown in a darker shade indicate raised features, with respect to the wafer's back surface ("back features"). The features near the wafer's edge attenuate radially to zero at about r=133 mm (i.e., at about x=±133 mm). The amplitude cross-section of the features is $\sin^2$ (x or y), with linear radial decay.

Figure 7:
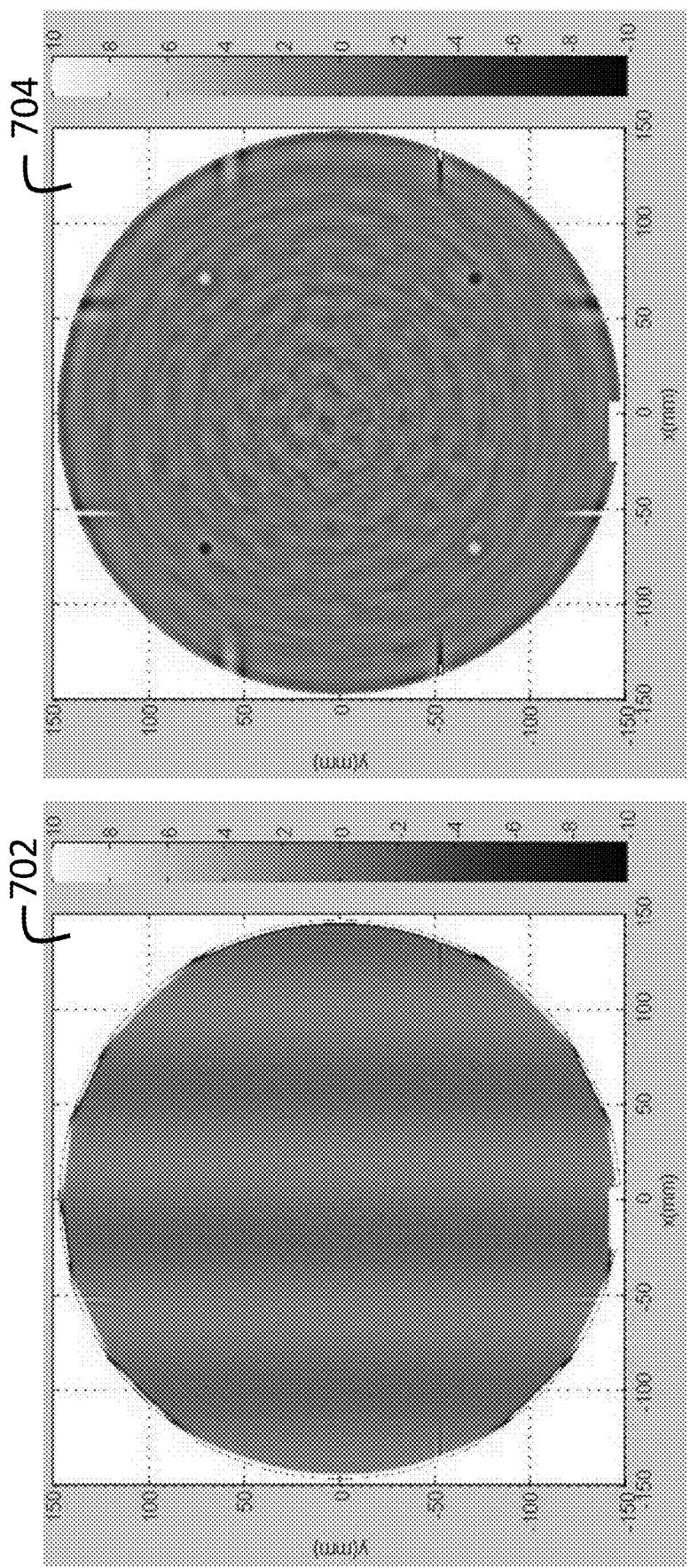
FIG. 7 includes maps of surface data and thickness data including the features shown in FIG. 6 added thereto.

FIG. 7 includes maps of surface data and thickness data including the localized features shown in FIG. 6 added thereto. More specifically, plot 702 is a surface map of wafer front surface data with the localized features, filtered using a 5 mm NMDG high-pass filter. The features are visible in the front surface data, but plot 702, despite using a 5 mm convolution kernel (as opposed to the 20 mm convolution kernel used to generate plot 402, shown in FIG. 4), is still dominated by long-wavelength bleed through and extreme edge-ringing due to reflected power from edge discontinuities. Moreover, the features near the edge are nearly filtered away by the 5 mm convolution filter. Accordingly, in attempting to minimize the long-wavelength bleed through by reducing the kernel size, important NT features are also minimized. As shown in plot 704, such problems are resolved when thickness data is used.

Plot 704 is a thickness map of wafer thickness data with the localized features, filtered using a 20 mm FFT-DG high-pass filter. The features are much clearer in the thickness map, with no long-wave bleed through and reduced edge discontinuities. It is apparent that using thickness maps is more appropriate for litho-NTM, as there are fewer issues imposed during filtering because higher-order wafer features are more easily filtered out, which allows for better visualization of NT features that are relevant to the lithography process.

Figure 8:
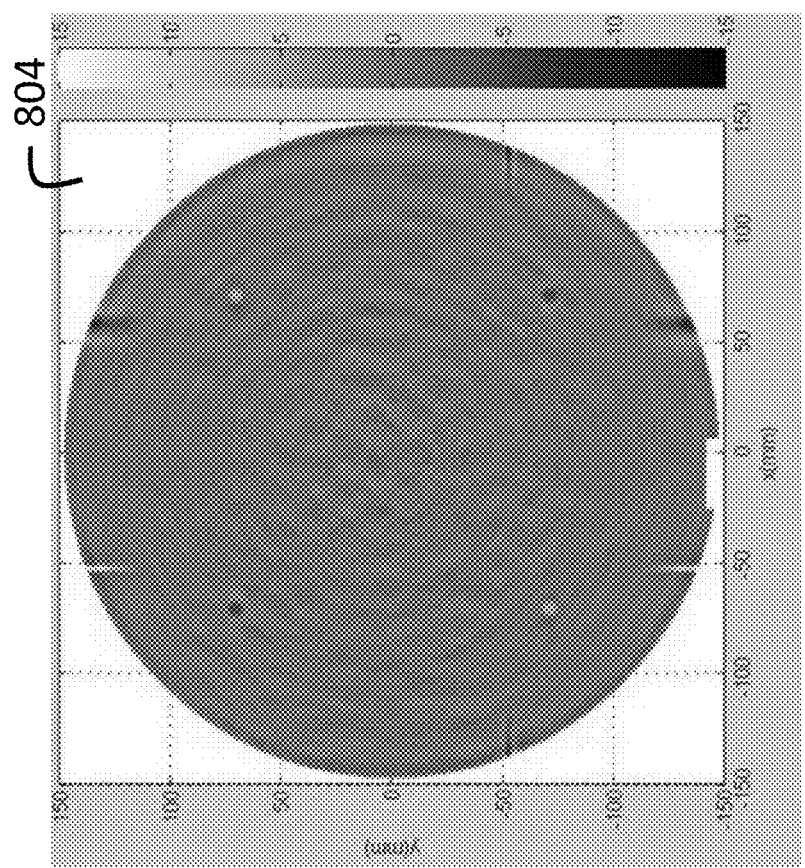
FIG. 8 includes two thickness maps generated using two Fast Fourier Transform-Double Gaussian filters.
Figure 8:
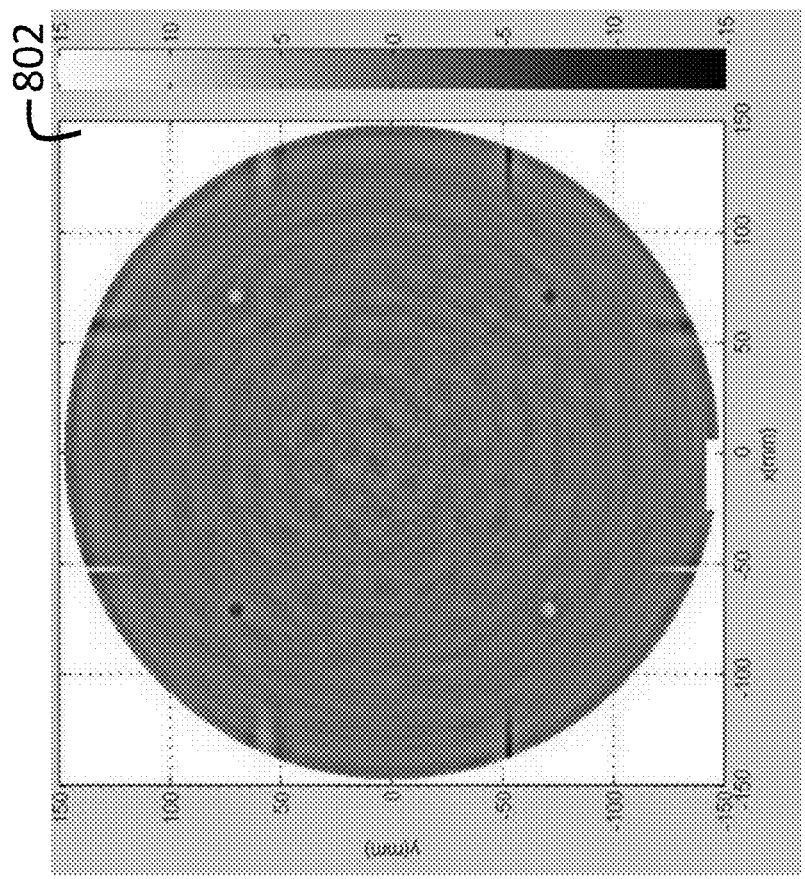

FIG. 8 includes two thickness maps generated using two FFT-DG filters. In one embodiment, the litho-NTM computing device is configured to generate and/or provide the thickness maps shown in plots 802 and 804. As discussed above with respect to FIGS. 4, 5, and 7, using an FFT-DG filter is more appropriate than an NMDG filter to generate thickness maps. Plots 802 and 804 show two thickness maps resulting from the application of two different FFT-DG filters. More particularly, plot 802 is a thickness map of wafer thickness data with a 20 mm circular FFT-DG filter applied thereto. In contrast, plot 804 is a thickness map of wafer thickness data with a 26 mm×8 mm elliptical FFT-DG filter applied thereto, with a 26 mm cutoff in the x-direction and an 8 mm cutoff in the y-direction. In the example embodiment, though a 26 mm×8 mm filter is employed, other filter dimensions are contemplated, including, for example, 26 mm×10 mm or 28 mm×6 mm. The particular dimensions of the filter are chosen such that the filter emulates the dimensions of the exposure area of modern step-and-scan lithography tools and, therefore, appropriately maps a chucked wafer as it would be exposed during the lithography process. Additionally, the filter has about 50% of the cutoff frequencies defined along one primary direction (e.g., x direction), the balance defined along another primary direction (e.g., y direction). The cutoff wavelength in the x-direction is long (e.g., about 26 mm) while cutoff wavelength in the y-direction is short (e.g., about 8 mm), such that the resulting height map represents a simulation of the local NT after leveling, such as during exposure by a step-and-scan lithography tool. Features that cannot be leveled away show up as NT while features that can be leveled away are eliminated from the filtered height map.

The horizontal edge features are dramatically reduced by the elliptical filter in plot 804. The 26×8 filter appropriately filters longer wavelengths in the x-direction, which are in practice removed during active leveling of the lithography tool, as well as shorter wavelengths in the y-direction, which contribute to focal plane deviation. In other words, this filter response appropriately emulates the continuous leveling of the lithography tool within a projected exposure area, producing a height map similar to a focal-plane deviation map. Accordingly, although a circular FFT-DG filter may produce a fair thickness map, it may be beneficial to choose an elliptical filter such that the output thickness map is relevant to the lithography context, for the purpose of reporting litho-NT features.

Figure 9:
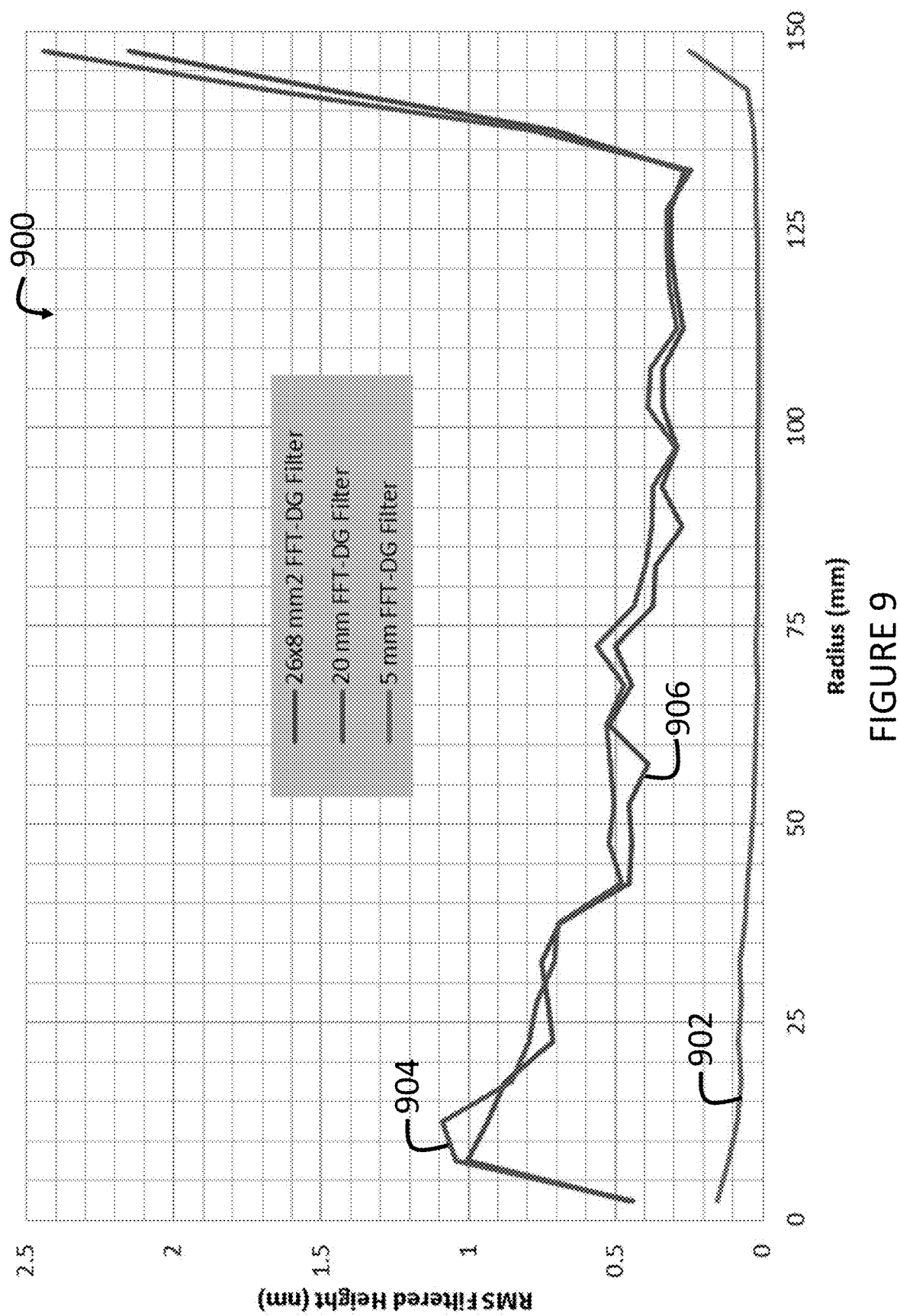
FIG. 9 is a plot of root mean square (RMS) height vs. radius for filtered thickness data for wafers without added features.

FIG. 9 is a plot 900 of root mean square (RMS) height vs. radius for filtered thickness data for wafers without localized features. More specifically, plot 900 shows RMS height for wafer thickness data filtered using a 5 mm FFT-DG filter 902, which shows that many NT features are filtered away when such a small cutoff (5 mm) is used. Plot 900 further includes an RMS height profile 904 for wafer thickness data filtered using a 20 mm FFT-DG filter. RMS height profile 904 corresponds to the thickness map shown in plot 802 (FIG. 8). Plot 900 also includes an RMS height profile 906 for wafer thickness data filtered using a 26 mm×8 mm FFT-DG filter, which corresponds to the thickness map shown in plot 804 (FIG. 8).

Figure 10:
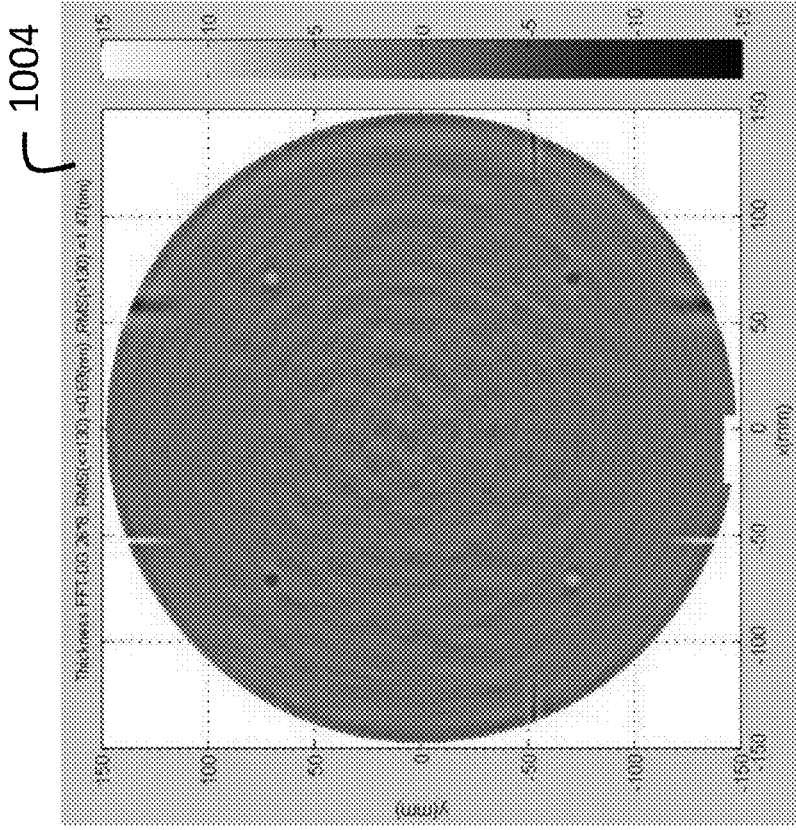
FIG. 10 includes two filtered thickness maps to illustrate wafer NT analysis and data reporting for wafers with and without localized features.
Figure 10:
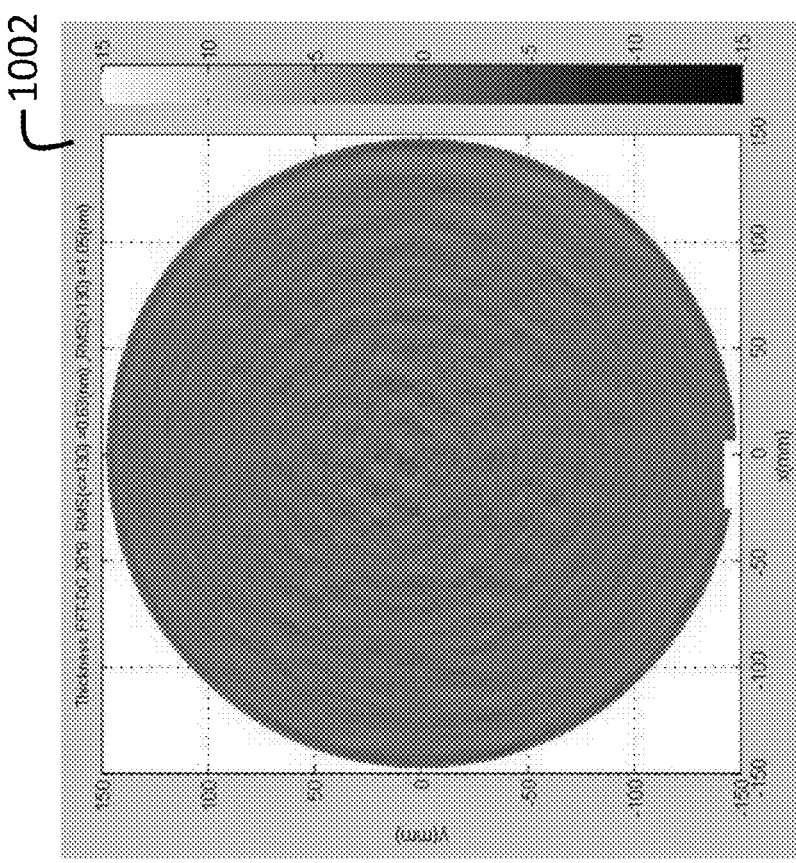
Figure 11:
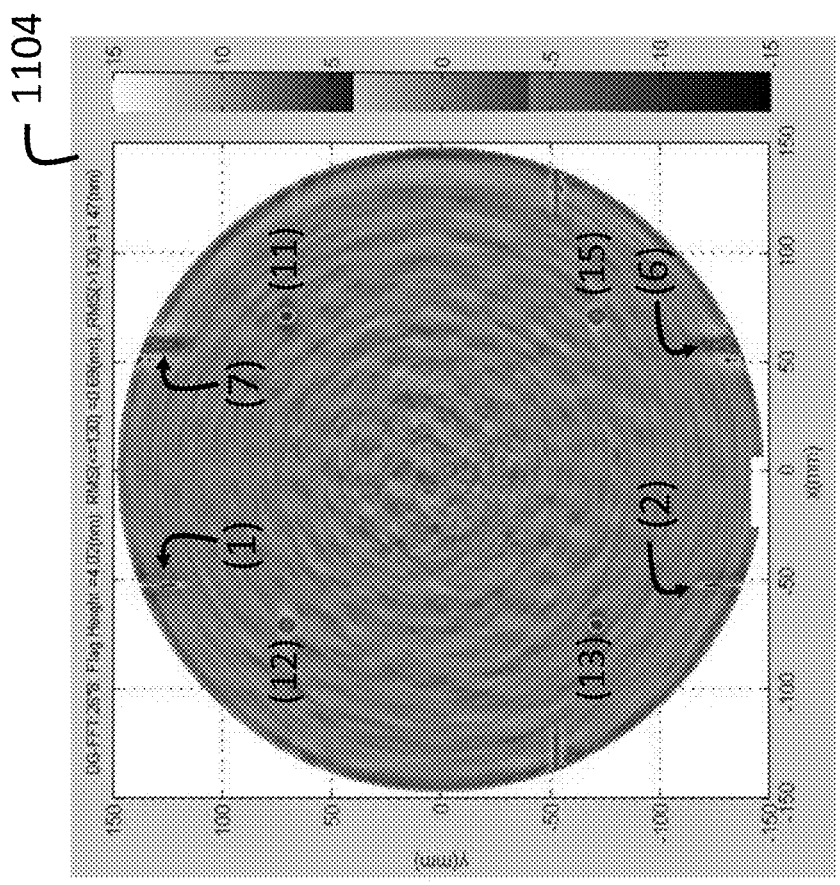
FIG. 11 includes the two filtered thickness maps shown in FIG. 10 to illustrate flagged NT feature areas for wafers with and without localized features.
Figure 11:
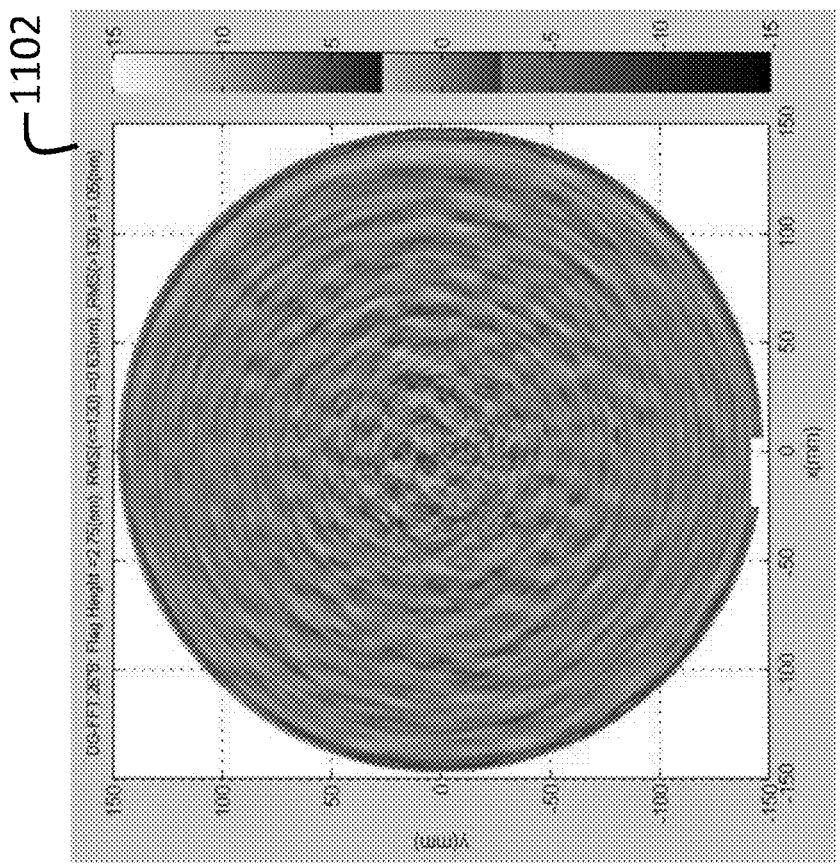

With reference to FIGS. 10 and 11, litho-NTM, or data reporting using thickness maps such as plot 804, is described. There are many usable metrics of NT, perhaps the simplest and most robust of which is RMS (root mean square) height variation. In the example embodiments described herein, RMS height variation is reported as a function of wafer radius. In particular, RMS height variation is reported for two radial zones, an inner radial zone and an outer radial zone. Although two zones are described, fewer or greater than two zones (i.e., n zones) may be used for reporting purposes. However, separating the wafer into two radial zones for reporting facilitates reporting metrics for the FQA separately from the wafer edge. As described above, the wafer edge often includes discontinuities, as it is subject to a number of additional processes (e.g., cutting, beveling, polishing), which causes a phenomenon known as edge roll-off as well as edge reflection. About 15-20 mm from the wafer edge, however, many of these issues are greatly reduced or eliminated. Accordingly, the wafer FQA boundary is typically several micrometers inward, radially, from the edge. Separating the wafer into an outer radial zone including the edge and an inner radial zone including the FQA simplifies metrics reporting, as the reported metrics are more targeted for zones of interest. Quality control for the two regions may thus be performed independently. In one embodiment, data reporting and analysis may be performed by the litho-NTM computing device.

The litho-NTM described herein involves a particular paradigm for locating and reporting litho-NT features. More specifically, a fixed percentage area (FPA) of the wafer is reported. By using an FPA as a reporting basis, the wafer as a whole is analyzed on a wafer-wide level. This FPA includes a plurality of individual areas including the most extreme NT features, based on the filtered thickness map (e.g., plot 804, shown in FIG. 8). Based on the FPA, a threshold or "flag height" of the most extreme NT features is generated. Each individual area including a feature that meets the flag height may be referred to as a "flagged area," as it is reported or called out due to the presence of the extreme NT feature therein. An area metric, such as a centroid (x,y) coordinate, mean height, and/or peak height for each flagged area may be reported, as well as other relevant metric(s). Accordingly, only the most relevant data points for the most extreme features are reported.

Referring now specifically to FIG. 10, two filtered thickness maps are included to illustrate wafer NT analysis and data reporting for wafers with and without localized features. Plot 1002 is a thickness map (i.e., thickness data filtered using a 26×8 FFT-DG filter, as described above with respect to plot 804) of a wafer without localized features. RMS height is reported for an inner radial zone, defined as r≤130 mm, and for an outer radial zone, defined as r>103 mm. RMS height for the inner radial zone is 0.63 nm, and RMS height for the outer radial zone is 1.05 nm.

Plot 1004 is a thickness map (i.e., thickness data filtered using the 26×8 FFT-DG filter, as described above) of a wafer with localized features (as shown in FIG. 6). RMS height is reported for the inner and outer radial zones, defined as in plot 1002. RMS height for the inner radial zone has risen to 0.69 nm with the localized features. RMS height for the outer radial zone has risen to 1.47 nm with the localized features, which is a significant increase over the RMS height for the outer zone in plot 1002. RMS height provides a metric that is both stable and flexible enough to be indicative of wafer quality, with respect to litho-NT. In other words, RMS height is sensitive to those features of a great enough magnitude to affect the quality of the wafer but robust enough that less extreme features, which can be accounted for during active levelling, do not dominate.

It is readily seen from the thickness map of plot 1004 that features affecting lithography are present on the wafer. The litho-NTM described herein further includes the reporting of these features in an efficient and precise manner. In particular, using the FPS as a basis for reporting allows the most extreme features to be identified without the need to report, analyze, or mine data for the area(s) of the wafer without extreme features. In the example embodiment of FIG. 11, for clarity, an FPA of 0.5% is used. However, it should be understood that a different FPA may be used, for example, 0.05% or 0.01%. The FPA may be assigned, for example, by a wafer end user, by wafer quality control personnel, and/or by wafer manufacturing personnel.

Once the FPA value is chosen, flagged areas having a total area up to the FPA value are identified, each flagged area corresponding to an area on the wafer including an NT feature above the flag height. For example, areas having feature heights the furthest from 0 are identified. The flag height may be reported as a wafer-level metric, which indicates the threshold level of "extremeness" of NT features present on the wafer. In other words, a low flag height for a wafer or a batch of wafers may indicate that there are few extreme features or that the features are not very extreme. Alternatively, a high flag height for a wafer or batch of wafers may indicate that there are one or more very extreme features. Other wafer-level metrics such as a pass/fail grade or an identification/ranking of the "worst" or most extreme flagged areas may be reported.

Additional area metrics are reported that correspond to individual the flagged areas, including the centroid coordinate for the flagged area, the area (mm²) of the flagged area, the mean and/or maximum height of the feature within the flagged area.

Referring now specifically to FIG. 11, two filtered thickness maps are included to illustrate flagged NT feature areas for wafers with and without localized features. Plot 1102 is thickness map shown in plot 1002 (FIG. 10; no localized features added) with an FPA of 0.5% reported flagged areas. The flag height of the flagged areas is 2.75 mm. In the example embodiment, the flagged areas are primarily located around the wafer edge. This may be a common occurrence, because, as described elsewhere herein, the wafer edge is prone to various discontinuities and variations. Table 1 reports the top 10 flagged areas and associated metrics for the thickness map in plot 1102, including mean FPD and the absolute value thereof; the wafer area encompassed by the particular flagged area; the extreme FPD; and coordinates of the centroid of the flagged area, in (x,y) and r.

TABLE 1

Flagged Area Metrics, no Localized Features Added

| Area (#) | Abs(Mean FPD (nm)) | Area (mm²) | Mean FPD (nm) | Extreme FPD (nm) | x (mm) | y (mm) | r (mm) |
|---|---|---|---|---|---|---|---|
| 1 | 3.48 | 33.40 | −3.48 | −4.58 | −140.15 | −36.36 | 144.79 |
| 2 | 3.24 | 134.60 | −3.24 | −3.82 | 143.91 | 1.91 | 143.93 |
| 3 | 3.09 | 25.20 | −3.09 | −3.42 | 108.55 | 96.05 | 144.95 |
| 4 | 3.06 | 0.12 | −3.06 | −3.30 | 147.10 | −14.30 | 147.79 |
| 5 | 3.04 | 0.08 | −3.04 | −3.26 | 113.60 | −94.80 | 147.96 |
| 6 | 3.04 | 13.56 | −3.04 | −3.53 | −131.39 | −60.22 | 144.53 |
| 7 | 3.03 | 28.32 | −3.03 | −3.55 | 135.65 | −51.80 | 145.20 |
| 8 | 3.03 | 2.32 | −3.03 | −3.36 | −26.16 | 2.62 | 26.29 |
| 9 | 3.00 | 35.52 | −3.00 | −3.47 | 132.11 | 58.00 | 144.28 |
| 10 | 3.00 | 0.08 | −3.00 | −3.13 | 146.50 | −19.60 | 147.81 |

Plot 1104 is the thickness map shown in plot 1004 (FIG. 10; localized features added) with an FPA of 0.5% reported flagged areas. The localized features dominate the flagged areas, which is to be expected, considering that the features have a height of 10-20 nm from a 0 reference point (see FIG. 6). The flag height in plot 1104 is 4.02 nm. This increase, from 2.75 nm in plot 1102, is a significantly larger percentage increase than even the RMS height of the outer region when localized features are added. The added features outweigh much of the edge discontinuities and variations shown in plot 1102. This is the desired result, as an extreme feature on the wafer (especially those located within the FQA) other than common edge defects may have more impact on the lithography process.

Table 2 reports the top 15 flagged areas and associated metrics for plot 1104, including mean FPD and the absolute value thereof; the wafer area encompassed by the particular flagged area; the extreme FPD; and coordinates of the centroid of the flagged area, in (x,y) and r. Areas 1 and 2 (shown in plot 1104) exhibit the highest mean and extreme FPD values, and areas 6 and 7 encompass the largest wafer area.

TABLE 2

Flagged Area Metrics, Localized Features Added

| Area (#) | Abs(Mean FPD (nm)) | Area (mm²) | Mean FPD (nm) | Extreme FPD (nm) | x (mm) | y (mm) | r (mm) |
|---|---|---|---|---|---|---|---|
| 1 | 7.87 | 38.68 | 7.87 | 15.60 | −52.80 | 130.51 | 140.79 |
| 2 | 7.76 | 36.28 | 7.76 | 15.18 | −52.82 | −130.76 | 141.03 |
| 3 | 6.65 | 12.60 | −6.65 | −9.90 | 134.85 | −52.70 | 144.78 |
| 4 | 6.41 | 4.32 | 6.41 | 10.20 | −136.38 | −55.40 | 147.20 |
| 5 | 6.04 | 13.80 | −6.04 | −8.87 | −134.11 | −52.74 | 144.11 |
| 6 | 5.99 | 44.28 | −5.99 | −9.18 | 57.36 | −131.90 | 143.83 |
| 7 | 5.83 | 38.92 | −5.83 | −9.44 | 57.36 | 132.39 | 144.28 |
| 8 | 5.78 | 3.00 | 5.78 | 8.00 | 136.39 | −55.26 | 147.16 |
| 9 | 5.30 | 0.08 | 5.30 | 5.93 | −54.60 | 137.50 | 147.94 |
| 10 | 5.29 | 6.80 | 5.29 | 6.79 | 50.03 | −138.50 | 147.26 |
| 11 | 5.25 | 19.84 | 5.25 | 6.33 | 70.56 | 70.56 | 99.79 |
| 12 | 5.20 | 20.12 | −5.20 | −6.28 | −71.20 | 70.49 | 100.19 |
| 13 | 5.19 | 19.60 | 5.19 | 6.11 | −71.14 | −71.09 | 100.57 |
| 14 | 5.10 | 5.44 | 5.10 | 6.26 | 64.50 | −132.45 | 147.32 |
| 15 | 4.96 | 19.76 | −4.96 | −5.89 | 70.40 | −71.17 | 100.11 |

The features reported in Tables 1 and 2, as examples, as well as the plots 1102 and 1104 themselves, facilitate efficient and precise stacked-map analysis of corresponding HVM wafers. The locations of features of many HVM wafers can be plotted on a single theoretical wafer area. Accordingly, process-specific "feature fingerprints" can be located and identified, even when they are statistically rare events (e.g., occurring only at one specific process tool of many tools available or utilized for the same process step).

Figure 12:
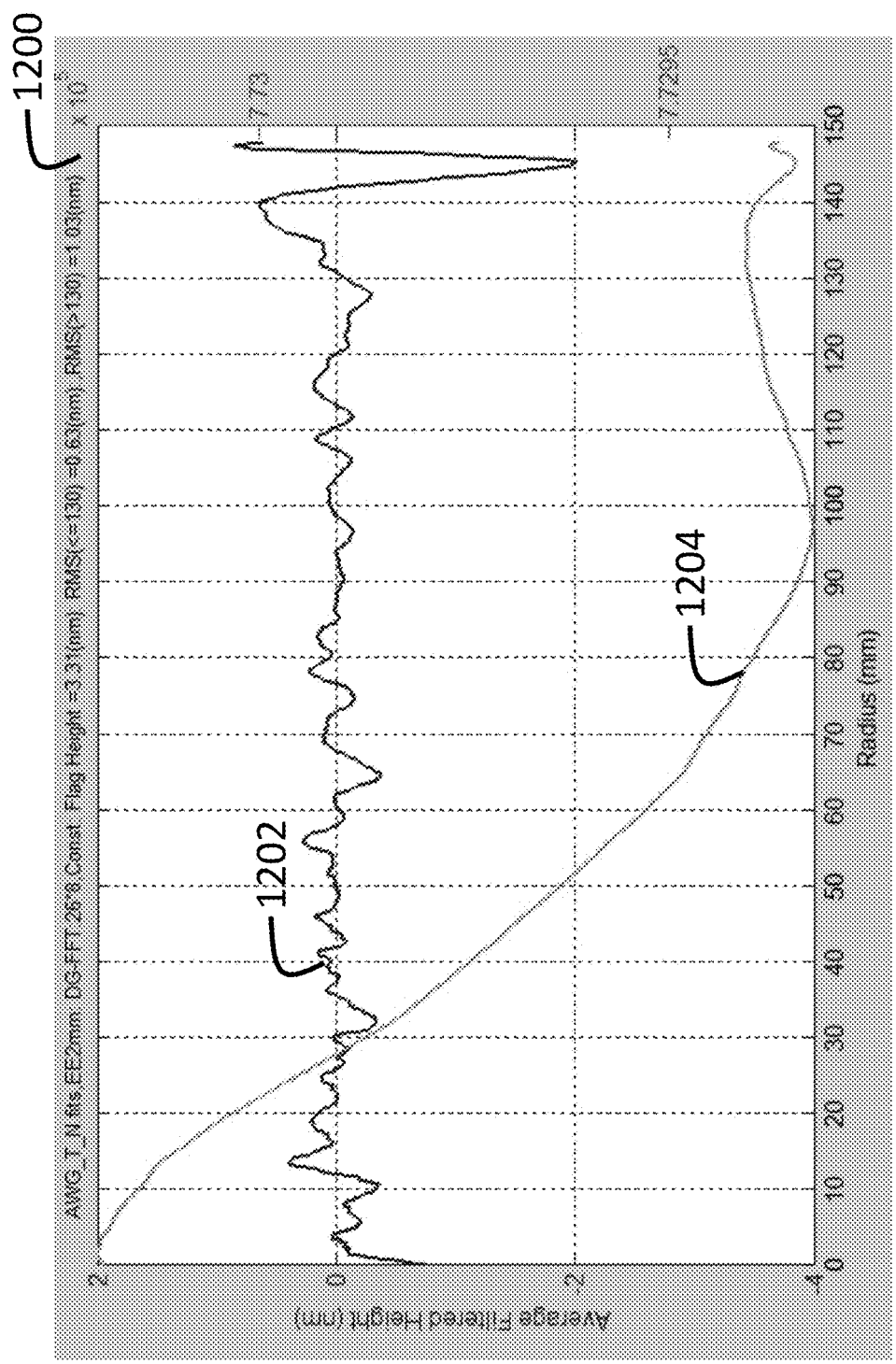
FIG. 12 includes a plot illustrating a wafer near-edge dip.

FIG. 12 includes a plot 1200 illustrating a wafer near-edge dip. In previous Figures, a wafer near-edge dip is apparent. See, for example, plot 900 in FIG. 9, plots 1002 and 1004 in FIG. 10, and plot 1102 in FIG. 11. Plot 1200 illustrates this dip in an average filtered height profile 1202 and an average radial profile of the raw thickness data 1204. This dip is due to a real feature present on many wafers, particularly recent-generation 300-mm wafers that required for advanced device nodes, which permits FFT-DG filtering of thickness data without significant edge reflection.

Figure 13:
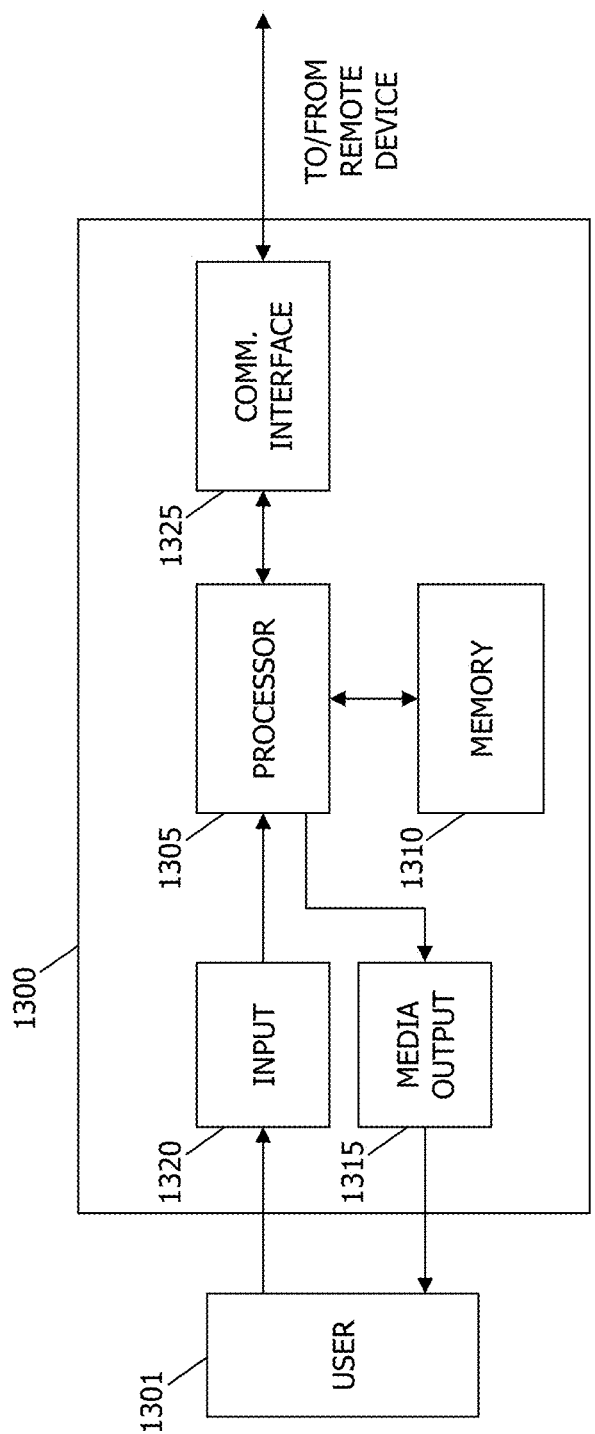
FIG. 13 is a block diagram of an example embodiment of a computing device suitable for providing the plots shown in FIGS. 1-12.

FIG. 13 is a block diagram of an example embodiment of a litho-NTM computing device 1300 suitable for providing the plots shown in FIGS. 1-12. For example, litho-NTM computing device 1300 is configured to generate a wafer thickness profile, apply a high-pass filter to thickness data, apply an NMDG and/or FFT-DG filter to thickness data to produce a filtered thickness map, to define an inner and an outer radial zone of the wafer on the thickness map, and/or to determine and report various wafer- and feature-level metrics for the wafer based on the thickness map. The litho-NTM computing device 1300 may have additional functionality to perform additional steps, including those described elsewhere herein.

The litho-NTM computing device 1300 includes a processor 1305 for executing instructions. In some embodiments, executable instructions are stored in a memory area 1310. The processor 1305 may include one or more processing units (e.g., in a multi-core configuration). The memory area 1310 is any device allowing information such as executable instructions and/or data to be stored and retrieved. The memory area 1310 may include one or more computer readable storage devices or other computer readable media, including transitory and non-transitory computer readable media.

In at least some implementations, the litho-NTM computing device 1300 also includes at least one media output component 1315 for presenting information to a user 1301 (e.g., a wafer end user, quality control personnel, etc.). The media output component 1315 is any component capable of conveying information to the user 1301. In some embodiments, the media output component 1315 includes an output adapter such as a video adapter and/or an audio adapter. An output adapter is operatively connected to the processor 1305 and operatively connectable to an output device such as a display device (e.g., a liquid crystal display (LCD), organic light emitting diode (OLED) display, cathode ray tube (CRT), or "electronic ink" display) or an audio output device (e.g., a speaker or headphones). In some embodiments, at least one such display device and/or audio device is included in the media output component 1015.

In some embodiments, the litho-NTM computing device 1300 includes an input device 1320 for receiving input from the user 1301. The input device 1320 may include, for example, a keyboard, a pointing device, a mouse, a stylus, a touch sensitive panel (e.g., a touch pad or a touch screen), a gyroscope, an accelerometer, a position detector, or an audio input device. A single component such as a touch screen may function as both an output device of the media output component 1315 and the input device 1320.

The litho-NTM computing device 1300 may also include a communication interface 1325, which may be communicatively connected to one or more remote devices. The communication interface 1325 may include, for example, a wired or wireless network adapter or a wireless data transceiver for use with a mobile phone network (e.g., Global System for Mobile communications (GSM), 3G, 4G or Bluetooth) or other mobile data network (e.g., Worldwide Interoperability for Microwave Access (WIMAX)).

Stored in the memory area 1310 are, for example, processor-executable instructions for providing a user interface to the user 1301 via media output component 1315 and, optionally, receiving and processing input from the input device 1020. The memory area 1310 may include, but is not limited to, any computer-operated hardware suitable for storing and/or retrieving processor-executable instructions and/or data. The memory area 1310 may include random access memory (RAM) such as dynamic RAM (DRAM) or static RAM (SRAM), read-only memory (ROM), erasable programmable read-only memory (EPROM), electrically erasable programmable read-only memory (EEPROM), and nonvolatile RAM (NVRAM). Further, the memory area 1310 may include multiple storage units such as hard disks or solid state disks in a redundant array of inexpensive disks (RAID) configuration. The memory area 1310 may include a storage area network (SAN) and/or a network attached storage (NAS) system. In some embodiments, the memory area 1310 includes memory that is integrated in the litho-NTM computing device 1300. For example, the litho-NTM computing device 1300 may include one or more hard disk drives as the memory area 1310. The memory area 1310 may also include memory that is external to the litho-NTM computing device 1300 and may be accessed by a plurality of computing devices. The above memory types are exemplary only, and are thus not limiting as to the types of memory usable for storage of processor-executable instructions and/or data.

Figure 14:
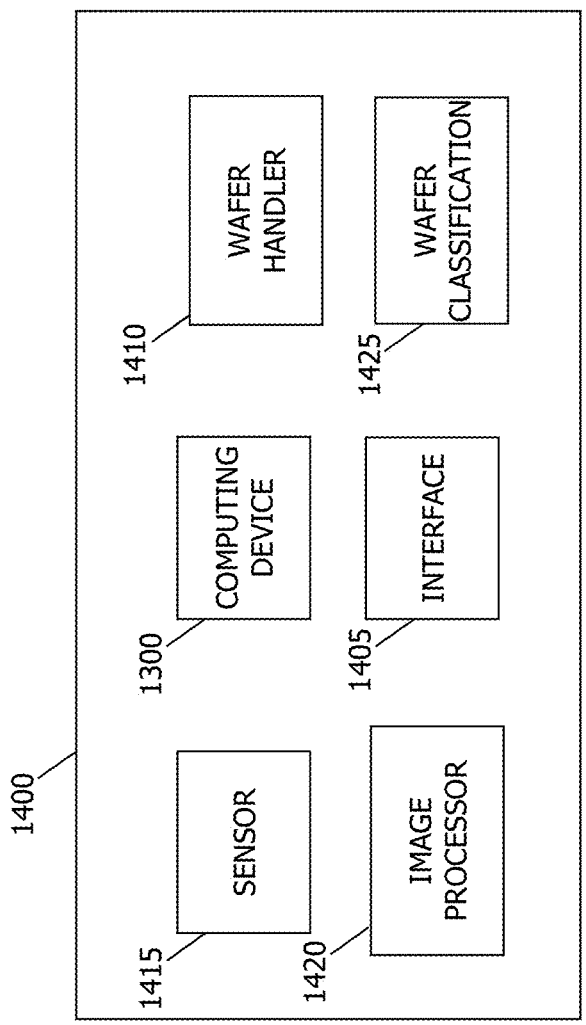
FIG. 14 is a block diagram of an example embodiment of a machine suitable for performing the litho-NTM analysis described herein.

FIG. 14 is a block diagram of an example embodiment of a machine 1400 suitable for performing the litho-NTM analysis described herein. In the example embodiment, machine 1400 includes litho-NTM computing device 1300, as shown in FIG. 13. Machine 1400 includes various other components as shown. It should be understood that any component may be communicatively coupled to any or all of the other components of machine 1400.

More specifically, machine 1400 includes an interface 1405. Interface 1405 facilitates interaction with machine 1400 and may include both input and output components. For example, interface 1405 may include a touch screen such that a user (e.g., user 1301, shown in FIG. 13) of machine 1400 can input various controls and instructions thereto. Interface 1405 may further include, for example, a monitor or other display device. The display device may facilitate display of any of the data and/or plots described herein.

Machine 1400 further includes a wafer handler 1410 and a sensor 1415. Accordingly, machine 1400 may perform thickness measurements on a plurality of wafers using wafer handler 1410, which may be any suitable combination of transfer mechanisms, holding mechanisms, wafer chucks, vacuum mechanisms, etc. Wafer handler 1410 may hold or transfer a wafer such that sensor 1415 may measure the thickness (or other wafer metrics) of the wafer. Sensor 1415 may include capacitance gauges, infrared interferometers, reflectometers, or any other suitable sensor.

Machine 1400 further includes an image processor 1420, which may be integral to litho-NTM computing device 1300 or separate therefrom. Image processor 1420 may include any processing and/or memory devices necessary to perform the image processing techniques described herein, including applying filters to thickness data to generate thickness maps.

Machine 1400 may further include a wafer classification component 1425. Wafer classification component 1425 may be configured to report the metrics described herein and/or receive such reports, such that wafer classification component may use such reports to classify HVM wafers (i.e., perform quality control of HVM wafers). For example, wafer classification component 1425 may be configured to decrease a wafer grade of a wafer or batch of wafers upon a report of specific NT features (e.g., features having a specific height or located within a specific area of the wafer). By implementing the litho-NTM methods described herein, the functionality of wafer classification component 1425 may be improved over existing wafer classification systems, for example, in classification speed and/or efficiency. As wafer classification component 1425 reports and/or receives reports of precise NT features of wafers (or batches of wafers), wafer classification component 1425 may process the reports and/or the metrics therein much faster, as little extraneous data mining or analysis is needed.

In the context of lithography, using thickness maps (also referred to as filtered height maps herein) for NTM reporting is appropriate, especially with reference to HVM wafer quality control. As described, thickness data can be filtered without edge attenuation, as is required when filtering surface data. Additionally, the use of FFT-DG filters provides a true spatial frequency response and facilitates elliptical filters that more appropriately emulate the lithography process. More specifically, elliptical filters having 50% cutoff frequencies defined along two primary direction (e.g., x and y), with a long cutoff wavelength in the x direction and a short cutoff wavelength in the y-direction, produces a filtered height map that simulates the local topography as it would be encountered by a lithography exposure station following active levelling. In contrast, current methods using the NMDG filters employ circular filters on wafer surface data, which may be dominated by long-wavelength bleed through and/or edge defects, or may filter away relevant NT features.

Moreover, the wafer-level NT reporting paradigm describes herein eliminates the need for defining arbitrary wafer "sites" to analyze and report site metrics therefor. Instead, the entire wafer, as a whole, is analyzed, and NT features are reported using precise locations (and other metrics), which enables more efficient data reporting. There is no superfluous or extraneous reported data, as only the absolute coordinates of the regions of interest (i.e., the most extreme features) are reported. The filtered thickness maps and the associated reported NT features facilitates stacked-map analysis to identify the most extreme litho-NT features. Stacked-map analysis and other quality control processes (e.g., various wafer classification and/or grading processes) may be performed more efficiently, as little or no data mining is required due to the precision of the data reporting implemented using the litho-NTM methods described herein. Accordingly, the throughput of such quality control processing may be increased (e.g., computer processing of wafers may be improved), such that more wafers are processed and/or classified per unit time.

When introducing elements of the present invention or the embodiment(s) thereof, the articles "a", "an", "the" and "said" are intended to mean that there are one or more of the elements. The terms "comprising", "including" and "having" are intended to be inclusive and mean that there may be additional elements other than the listed elements.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A method for lithography nanotopography metrology, said method including:
   receiving wafer thickness data for a plurality of wafers;
   applying an elongated Fast Fourier Transform-Double Gaussian filter with a first cutoff wavelength in an x-direction and a second cutoff wavelength in a y-direction to the wafer thickness data to produce a filtered thickness map for each of the plurality of wafers; and
   generating a report including at least one wafer metric associated with the filtered thickness map.

2. The method of claim 1, further comprising:
   defining a fixed percentage area for which to report the at least one wafer metric; and
   identifying a plurality of flagged areas up to the fixed percentage area, wherein said identifying comprises identifying centroid coordinates for each of the plurality of flagged areas on a respective thickness map.

3. The method of claim 2, further comprising determining at least one area metric for each of the plurality of flagged areas, wherein said generating a report further comprises generating a report further including the centroid coordinates for each of the plurality of flagged areas on a respective thickness map and the at least one area metric for each of the plurality of flagged areas.

4. The method of claim 1, wherein the first cutoff wavelength is longer than the second cutoff wavelength.

5. The method of claim 4, wherein the first cutoff wavelength is 26 mm and the second cutoff wavelength is 8 mm.

6. The method of claim 1, further comprising defining an inner radial zone and an outer radial zone of each wafer, and wherein the report further includes at least one inner radial metric and at least one outer radial metric.

7. The method of claim 3, wherein the at least one area metric includes at least one of: a flag height based on a height of nanotopography features corresponding to the flagged areas (flagged area threshold height); a mean focal plane deviation; an extreme focal plane deviation; and an area of each of the flagged areas.

8. The method of claim 1, further comprising applying a pass/fail grade to wafers based on the at least one wafer metric.

9. The method of claim 1, wherein applying an elongated filter to the wafer thickness data comprises applying an elliptical filter to the wafer thickness data.

10. A system for lithography nanotopography metrology comprising:
    a processor;
    a display device;
    a memory device, the memory device storing instructions that, when executed by the processor, cause the system to:
    receive wafer thickness data for a plurality of wafers;
    apply an elongated Fast Fourier Transform-Double Gaussian filter with a first cutoff wavelength in an x-direction and a second cutoff wavelength in a y-direction to the wafer thickness data to produce a filtered thickness map for each of the plurality of wafers;
    generate a report including at least one wafer metric associated with the filtered thickness map; and
    display the report on the display device.

11. The system of claim 10, wherein the instructions, when executed by the processor, further cause the system to:
    define a fixed percentage area for which to report the at least one wafer metric; and
    identify a plurality of flagged areas up to the fixed percentage area by identifying centroid coordinates for each of the plurality of flagged areas on a respective thickness map.

12. The system of claim 11, wherein the instructions, when executed by the processor, further cause the system to:
    determine at least one area metric for each of the plurality of flagged areas, and generate the report including the centroid coordinates for each of the plurality of flagged areas on a respective thickness map and the at least one area metric for each of the plurality of flagged areas.

13. The system of claim 10, wherein the first cutoff wavelength is longer than the second cutoff wavelength.

14. The system of claim 13, wherein the first cutoff wavelength is 26 mm and the second cutoff wavelength is 8 mm.

15. The system of claim 10, wherein the instructions, when executed by the processor, further cause the system to define an inner radial zone and an outer radial zone of each wafer, and wherein the report further includes at least one inner radial metric and at least one outer radial metric.

16. The system of claim 12, wherein the at least one area metric includes at least one of: a flag height based on a height of nanotopography features corresponding to the flagged areas (flagged area threshold height); a mean focal plane deviation; an extreme focal plane deviation; and an area of each of the flagged areas.

17. The system of claim 10, wherein the instructions, when executed by the processor, further cause the system to apply a pass/fail grade to wafers based on the at least one wafer metric.

18. A method for lithography nanotopography metrology, said method including:
    receiving wafer thickness data for a plurality of wafers;
    applying an elongated filter with a first cutoff wavelength in an x-direction and a second cutoff wavelength in a y-direction to the wafer thickness data to produce a filtered thickness map for each of the plurality of wafers, the first cutoff wavelength is 26 mm and the second cutoff wavelength is 8 mm; and generating a report including at least one wafer metric associated with the filtered thickness map.

19. The method of claim 18, further comprising:

defining a fixed percentage area for which to report the at least one wafer metric; and identifying a plurality of flagged areas up to the fixed percentage area, wherein said identifying comprises identifying centroid coordinates for each of the plurality of flagged areas on a respective thickness map.

20. The method of claim 19, further comprising determining at least one area metric for each of the plurality of flagged areas, wherein said generating a report further comprises generating a report further including the centroid coordinates for each of the plurality of flagged areas on a respective thickness map and the at least one area metric for each of the plurality of flagged areas.

21. The method of claim 18, wherein applying an elongated filter to the wafer thickness data comprises applying an elongated Fast Fourier Transform-Double Gaussian filter.

22. The method of claim 18, further comprising defining an inner radial zone and an outer radial zone of each wafer, and wherein the report further includes at least one inner radial metric and at least one outer radial metric.

23. The method of claim 18, wherein applying an elongated filter to the wafer thickness data comprises applying an elliptical filter to the wafer thickness data.

24. A system for lithography nanotopography metrology comprising:

a processor;

a display device;

a memory device, the memory device storing instructions that, when executed by the processor, cause the system to:

receive wafer thickness data for a plurality of wafers;

apply an elongated filter with a first cutoff wavelength in an x-direction and a second cutoff wavelength in a y-direction to the wafer thickness data to produce a filtered thickness map for each of the plurality of wafers, the first cutoff wavelength is 26 mm and the second cutoff wavelength is 8 mm;

generate a report including at least one wafer metric associated with the filtered thickness map; and display the report on the display device.

25. The system of claim 24, wherein the instructions, when executed by the processor, further cause the system to:

define a fixed percentage area for which to report the at least one wafer metric; and identify a plurality of flagged areas up to the fixed percentage area by identifying centroid coordinates for each of the plurality of flagged areas on a respective thickness map.

26. The system of claim 24, wherein the instructions, when executed by the processor, further cause the system to:

determine at least one area metric for each of the plurality of flagged areas, and generate the report including the centroid coordinates for each of the plurality of flagged areas on a respective thickness map and the at least one area metric for each of the plurality of flagged areas.

27. The system of claim 24, wherein the instructions, when executed by the processor, cause the system to apply an elongated filter to the wafer thickness data by applying an elongated Fast Fourier Transform-Double Gaussian filter.

28. The system of claim 26, wherein the at least one area metric includes at least one of: a flag height based on a height of nanotopography features corresponding to the flagged areas (flagged area threshold height); a mean focal plane deviation; an extreme focal plane deviation; and an area of each of the flagged areas.

29. The system of claim 24, wherein the instructions, when executed by the processor, further cause the system to apply a pass/fail grade to wafers based on the at least one wafer metric.

* * * * *